Sept. 3, 1935.   B. T. HEADLEY ET AL   2,013,463
GLASS WORKING MACHINE
Filed May 3, 1928    13 Sheets-Sheet 2

INVENTORS
Benjamin T. Headley
David J. DuBois

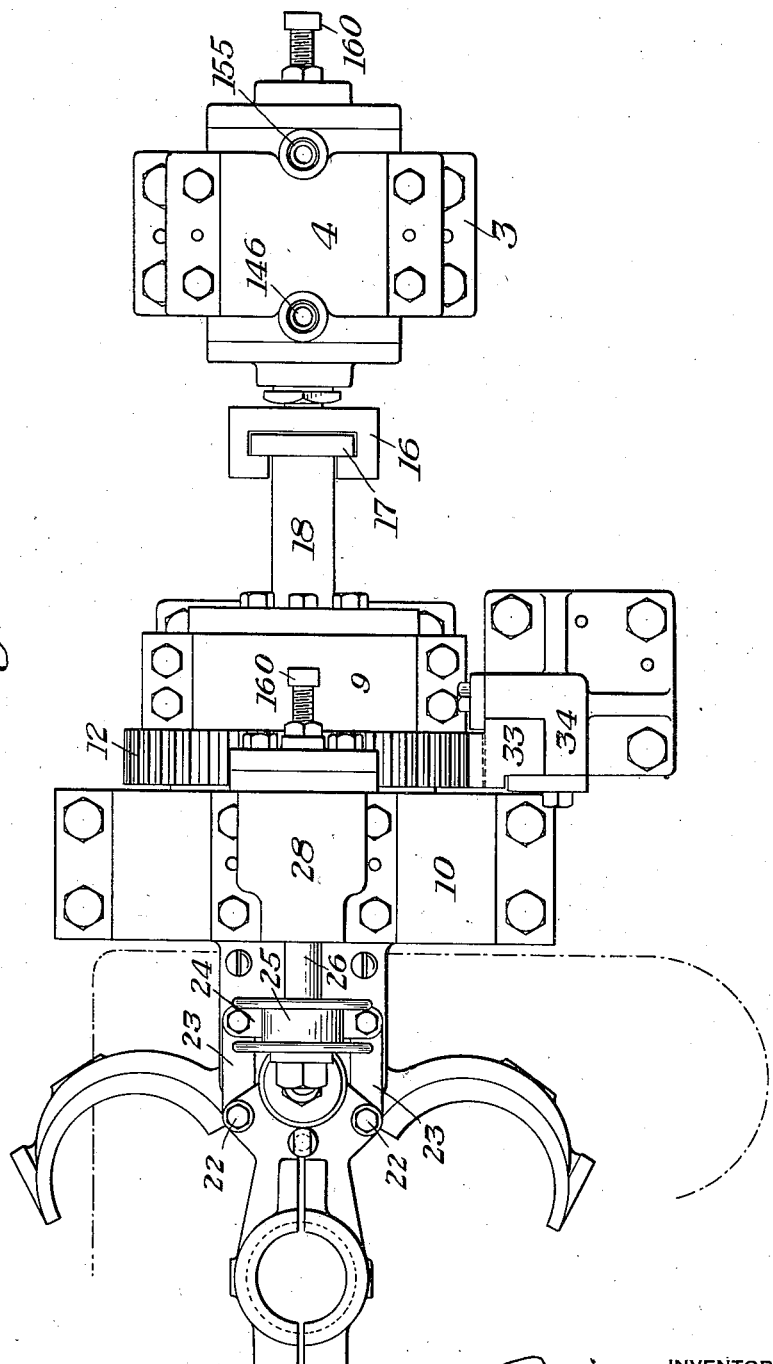

Sept. 3, 1935.                B. T. HEADLEY ET AL                2,013,463
                              GLASS WORKING MACHINE
                          Filed May 3, 1928        13 Sheets-Sheet 5
Fig. 15.                                   Fig. 3ᵇ.
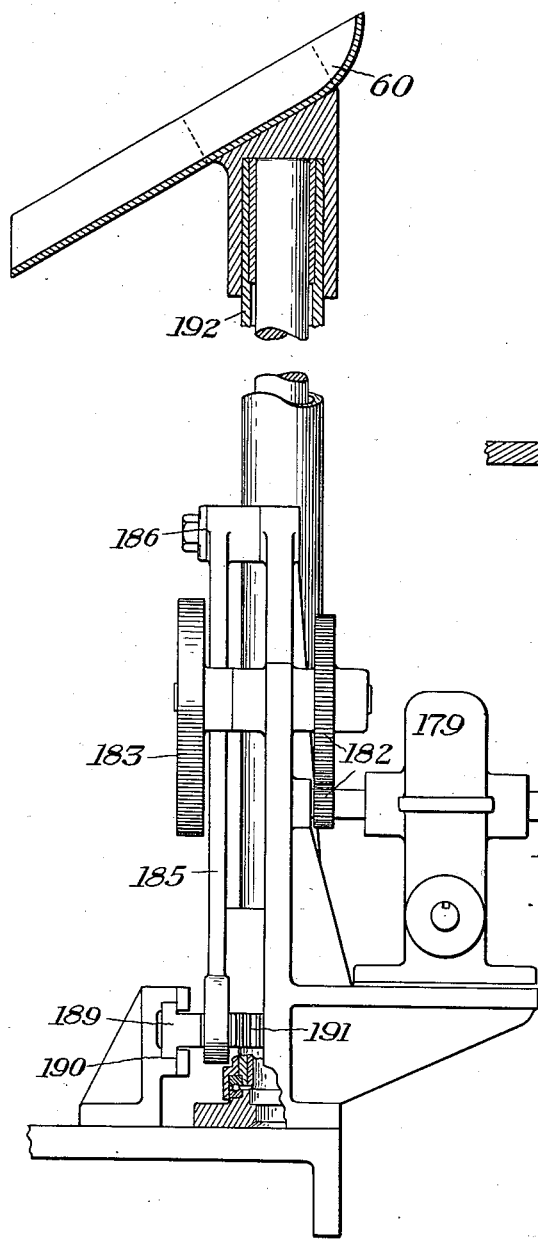
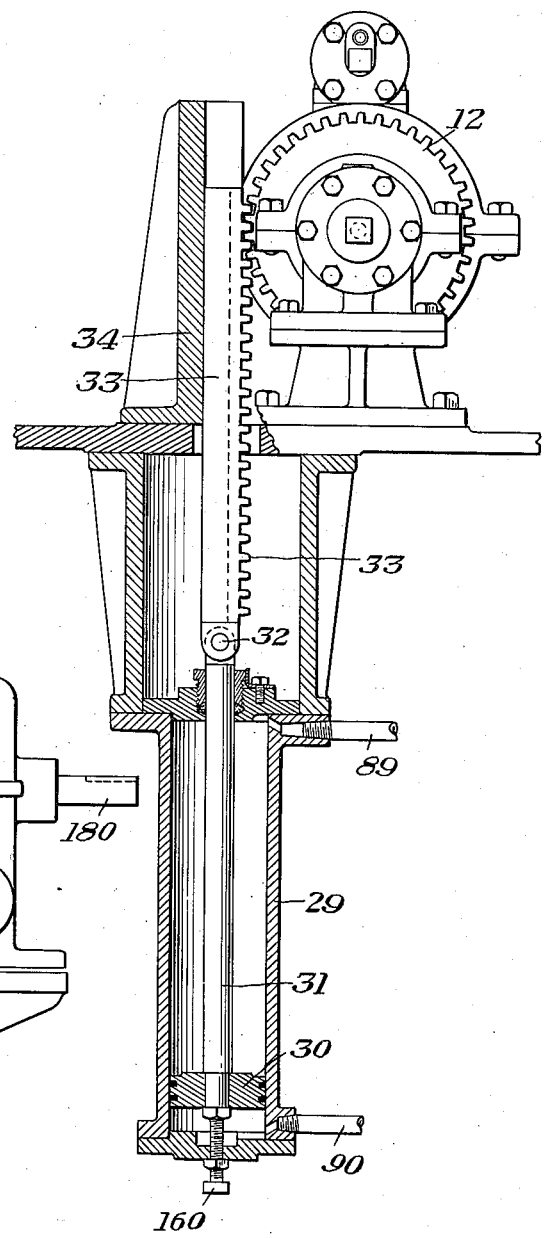
INVENTORS

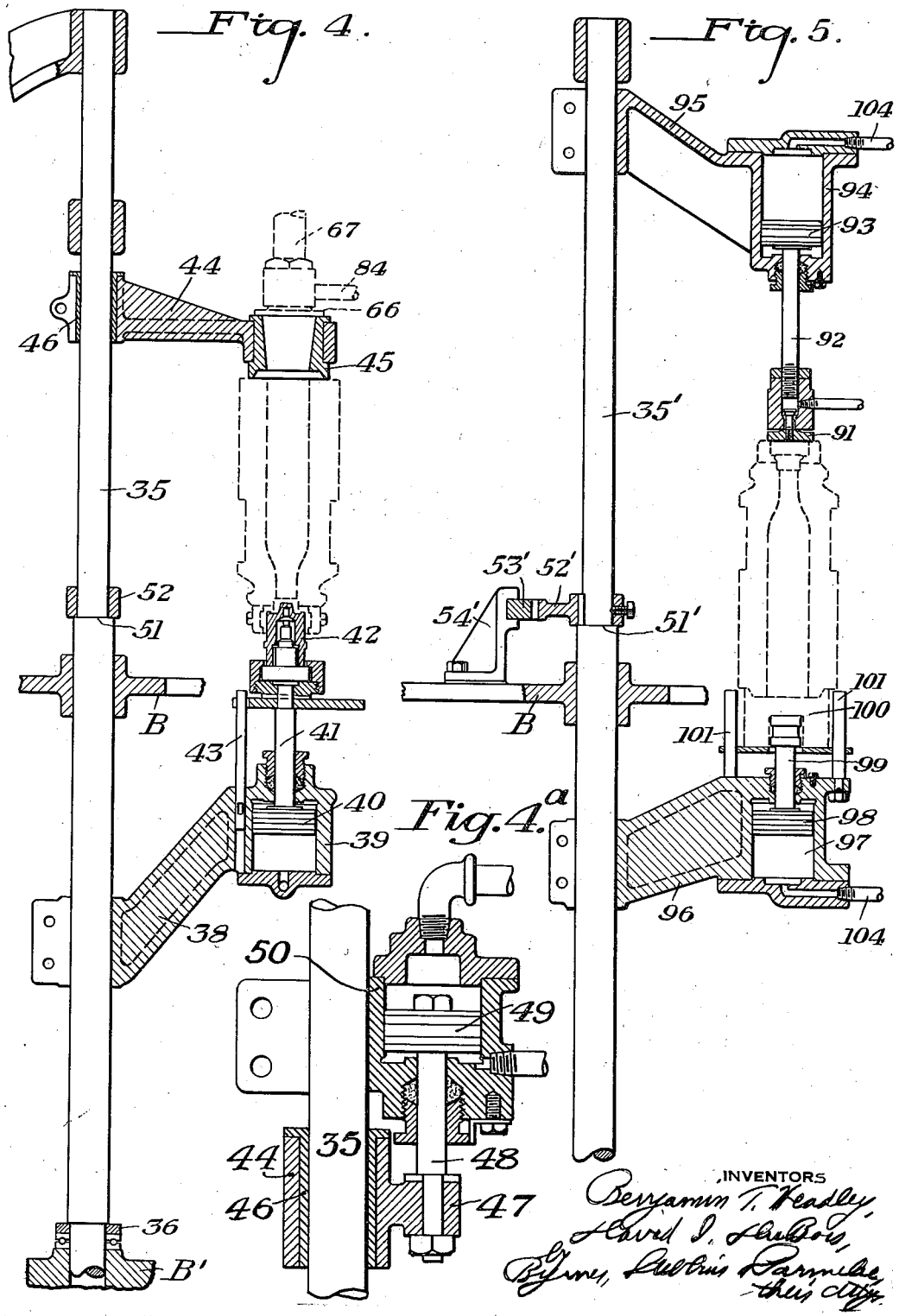

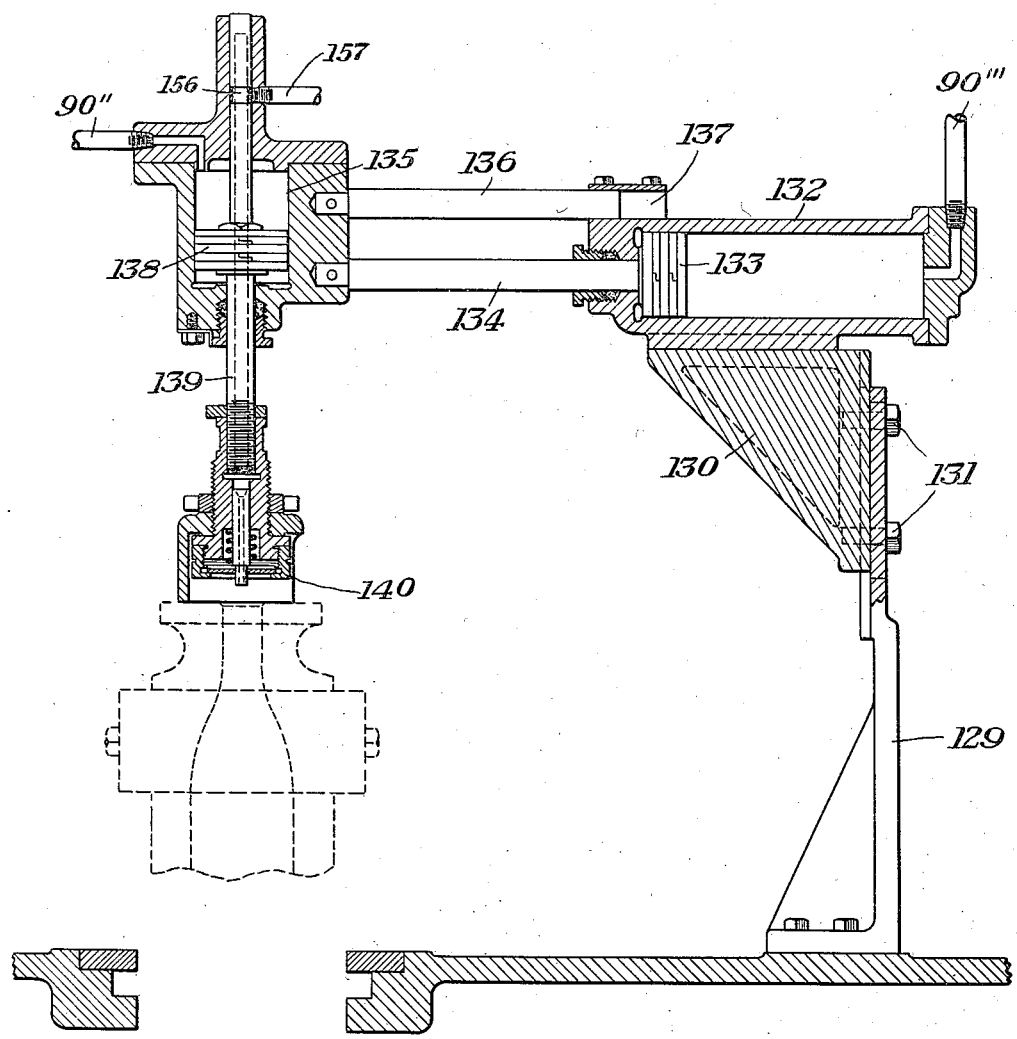

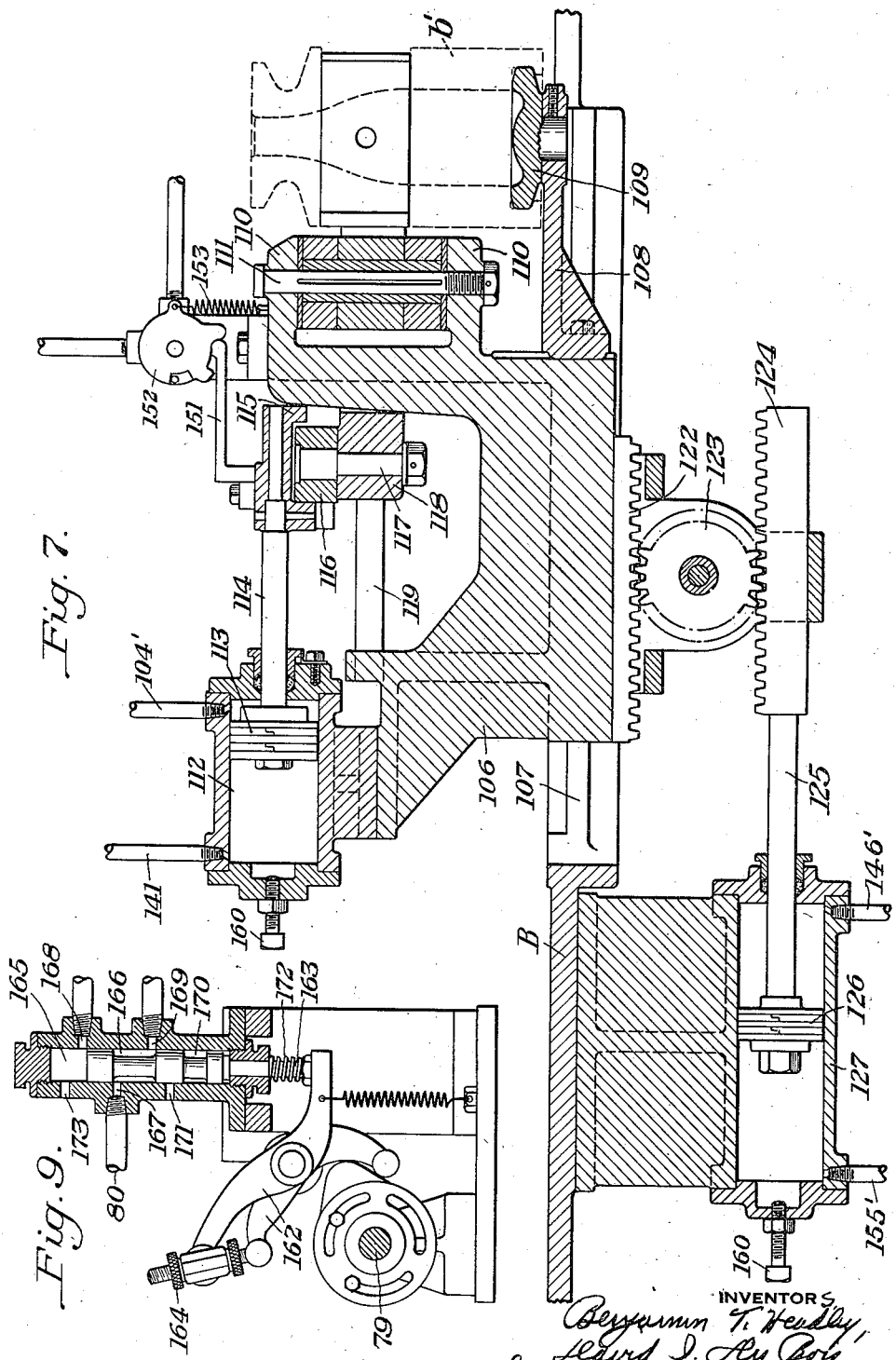

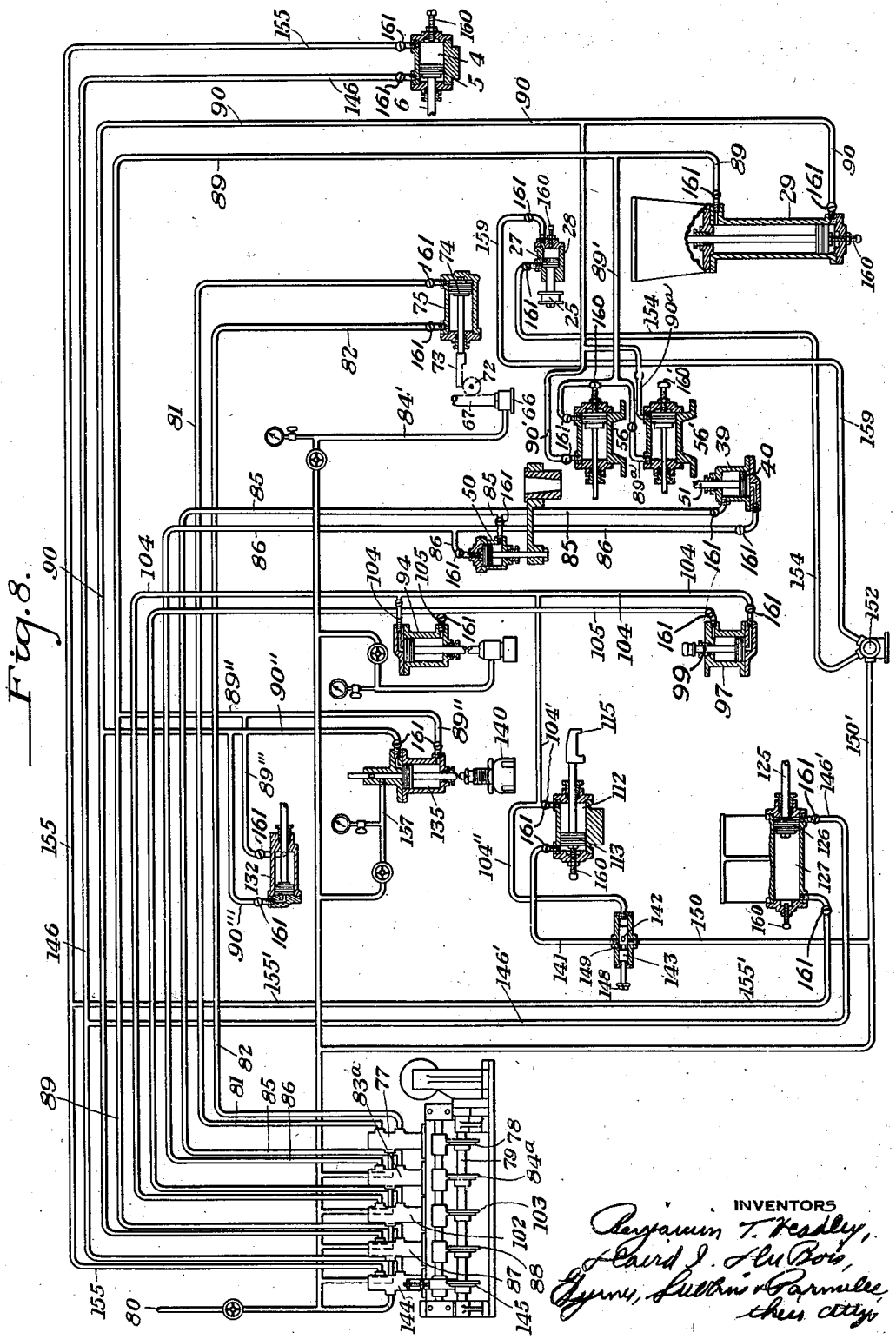

Sept. 3, 1935.　　　　B. T. HEADLEY ET AL　　　　2,013,463
GLASS WORKING MACHINE
Filed May 3, 1928　　　13 Sheets-Sheet 10
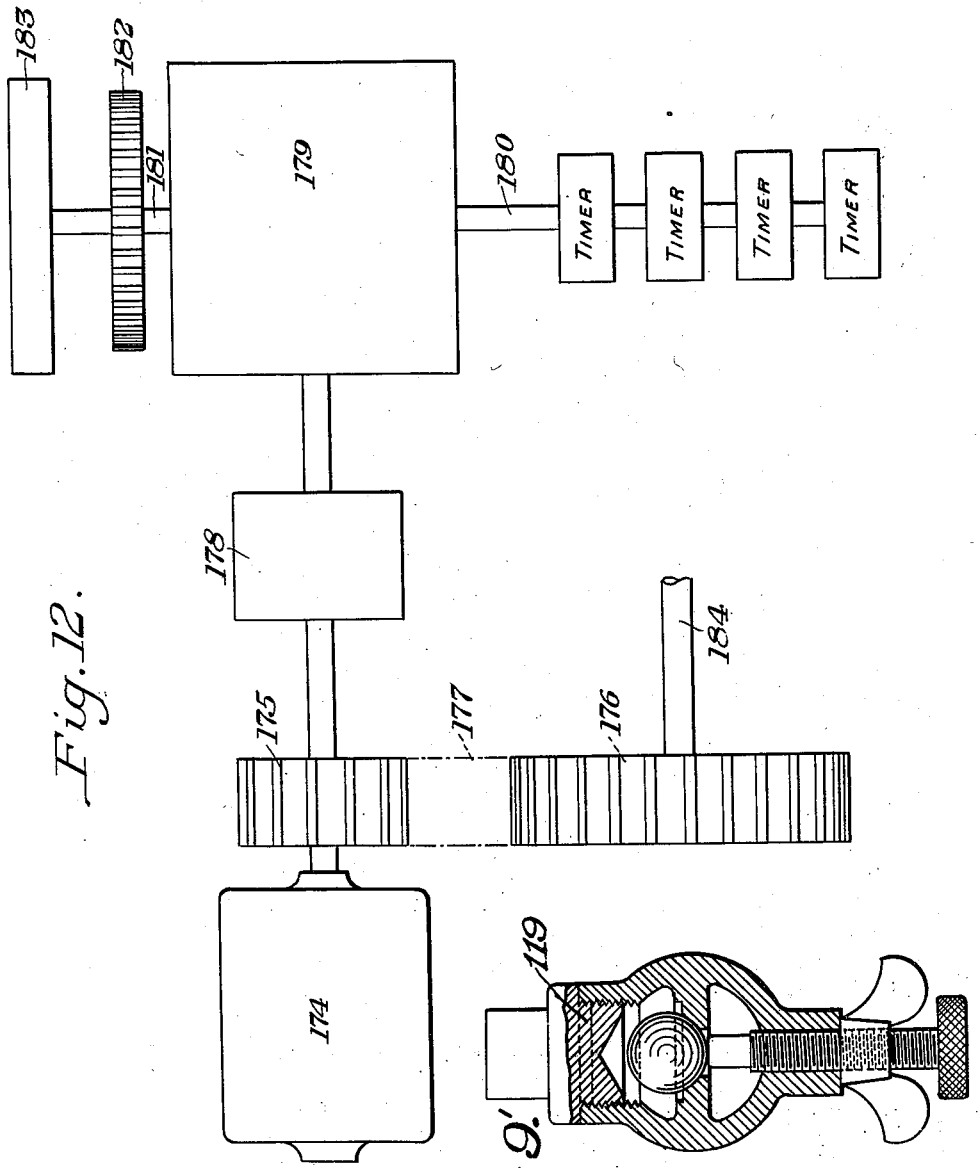
INVENTORS.

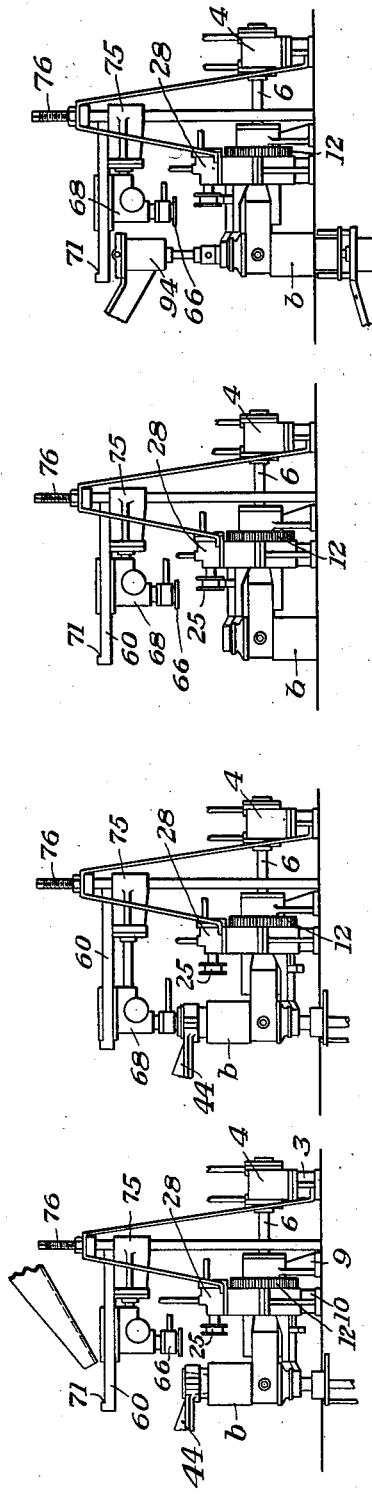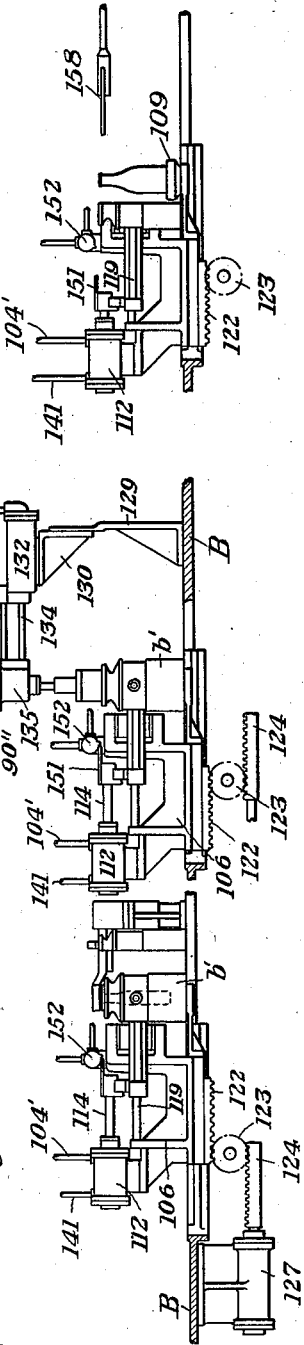

Sept. 3, 1935.   B. T. HEADLEY ET AL   2,013,463
GLASS WORKING MACHINE
Filed May 3, 1928   13 Sheets-Sheet 12
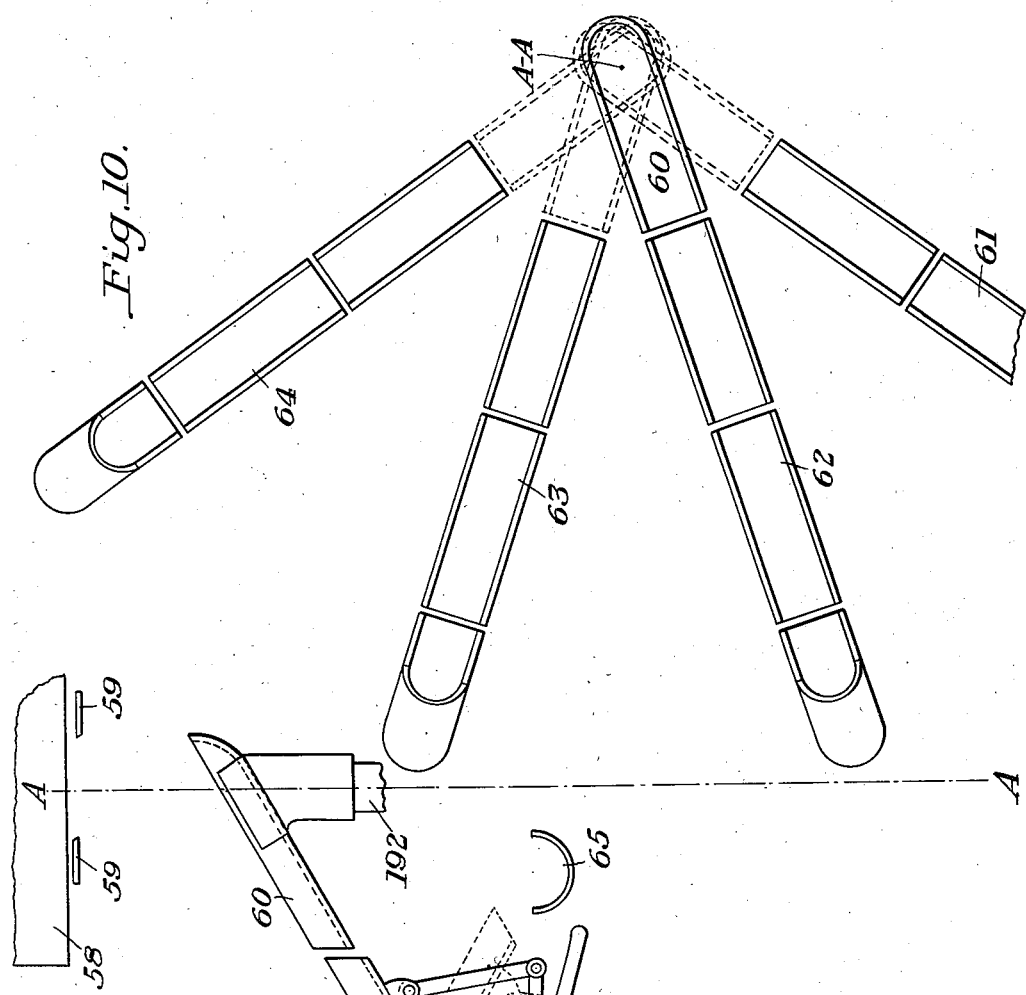
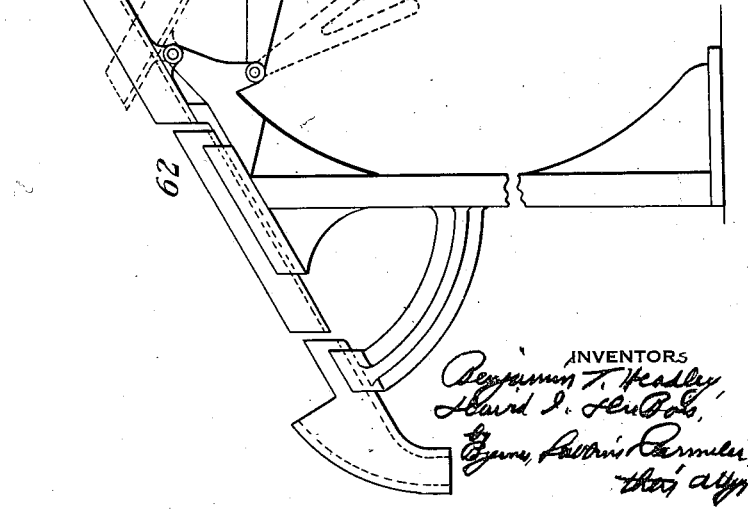
INVENTORS Sept. 3, 1935.   B. T. HEADLEY ET AL   2,013,463
GLASS WORKING MACHINE
Filed May 3, 1928   13 Sheets-Sheet 13

INVENTORS

Patented Sept. 3, 1935

2,013,463

UNITED STATES PATENT OFFICE 2,013,463

GLASS WORKING MACHINE

Benjamin T. Headley and David Irvin Du Bois, Millville, N. J., assignors, by mesne assignments, to Hartford-Empire Company, Hartford, Conn., a corporation of Delaware Application May 3, 1928, Serial No. 274,704

6 Claims. (Cl. 49—9)

The present invention relates broadly to the art of glassware making, and more particularly to a machine adapted for the production of so-called narrow neck ware although the utility of the invention is not limited with respect to the particular articles manufactured thereon.

Experience has shown that the most desirable results in the manufacture of narrow neck ware are obtained in a machine having suitable provision for effecting a packing of the charge to form the proper finish on the neck end thereof, in combination with means for preliminarily expanding the packed charge preferably in a confined cavity to produce a parison of invariable outside dimensions ready for transfer to a blow mold.

The present invention contemplates a machine, automatic in its operation, and of such construction as to accomplish the preliminary packing operation by the establishment of a differential fluid pressure in the opposite ends of the mold, preferably by the application of air under pressure to one end thereof.

It also contemplates the preliminary blowing of the packed charge to substantially hollow form by the use of air in sufficient volume and pressure, the expanding being accomplished while the parison is enclosed within confining walls whereby definite outside dimensions in the parison irrespective of possible variations in the size of the gathers is insured.

The invention further contemplates the charging of a mold while in inverted position, together with the automatic inversion of the mold at a time preferably subsequent to the packing of the charge and prior to the transfer to the blow mold and the blowing to hollow form therein. It has been found that where one of the blows occurs with the mold in one position and another blow with the mold in the opposite position, there is obtained a strong shoulder, together with a uniform distribution of the glass and a strong bottom.

The invention further contemplates the performance of all of the foregoing operations in predetermined timed relation to each other, the timing of any one of the operations with respect to another operation being capable of mechanical adjustment as may be found desirable with ware of different shapes, sizes, or weights, or with glass of different characteristics or quality.

It has heretofore been customary in the production of narrow neck ware to carry on the forming operations in a machine which is either continuously or intermittently rotatable. It has been found that the rotation of the parts tends to swing the parisons out of a true central position with respect to the molds, thereby resulting in finished ware in which the glass distribution is not as uniform as might be desired.

In accordance with the present invention all of the forming operations are carried on under such conditions that swinging movements of this character are not encountered.

The present invention also aims to provide a machine having a maximum production as compared to intermittently rotating machines, in that the time required for successive table movements and ordinarily lost insofar as any forming operations are concerned, is saved, and the entire time during which the machine is in use rendered available for the carrying on of a desired function.

In the accompanying drawings, there are shown four complete units, each embodying a blank or parison mold and a cooperating blow or finishing mold, together with the necessary formative elements for the production of finished ware. The present invention lends itself, however, to any desired number of complete units and to various locations thereof. The preferred location, however, involves the positioning thereof at a distance from a charging point such that a single mechanism may successively deliver the gathers to the molds of all of the units. Such an arrangement is particularly desirable in connection with the machine feeding of glass, it being possible to operate a feeder at a speed greater than the possible speed of operation of the average forming machine. With an arrangement of the character indicated, the machine feeder may be operated at maximum efficiency, and the bottle forming and formative elements of each unit may likewise be operated to the best advantage.

In the accompanying drawings, we have shown for purposes of illustration only, certain preferred embodiments of our invention, it being understood that the drawings do not define the limits of our invention as changes in the construction, number, and arrangement of the different parts may be made without departing either from the spirit of the invention or the scope of our broader claims.

In the drawings:—

Figure 3a is a top plan view of a portion of the mechanism illustrated in Figure 3;

Figure 3b is a detail sectional view illustrating a portion of the blank mold inverting mechanism;

Figure 4 is a sectional diagrammatic view showing the parts in position during the primary blowing or packing operation;

Figure 4a is a detail sectional view offset with respect to Figure 4, and illustrating the raising and lowering mechanism for the pouring guide bracket;

Figure 5 is a view similar to Figure 4 showing the relative positions of the bottle forming and formative elements during the secondary or blow back operation by means of which the expanding of the parison to hollow form is accomplished;

Figure 6 is a detail sectional view illustrating the mounting and construction of the final blow-head by means of which the expanded parison is blown to hollow form, together with the operating connections for such blow-head;

Figure 7 is a detail sectional view, with certain of the parts in elevation, for the purpose of illustrating the manner of supporting and moving one of the blow-molds and its associated parts;

Figure 8 is a diagrammatic sectional view showing the piping connections by means of which fluid pressure for operating purposes is delivered to the various forming, formative, or operating elements of one of the units;

Figure 9 is a detail sectional view through one of the controlling valves;

Figure 13:
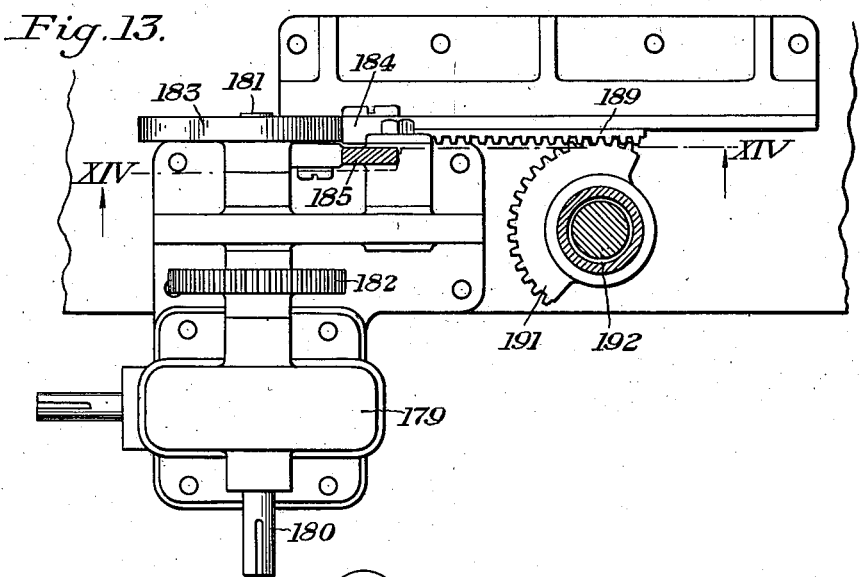
Figure 14:
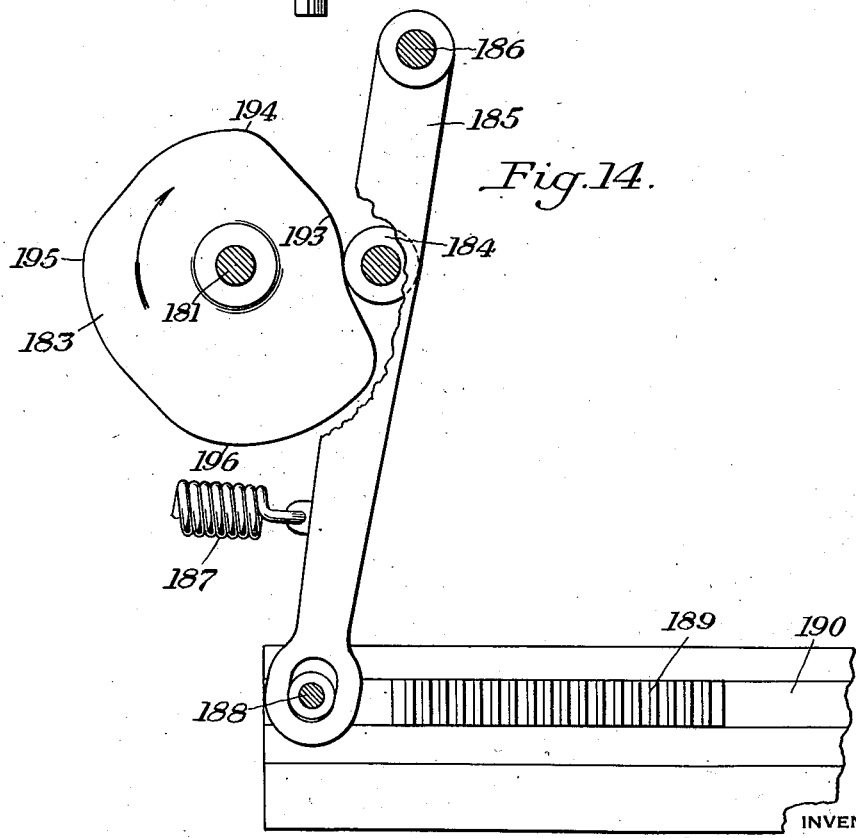

Figure 9' is a vertical sectional view through one of the check valves provided for each of the cylinders;

Figures 9a, 9b, 9c, 9d, 9e, 9f, and 9g are diagrammatical elevational views showing respectively the position of the parts during the charging of a parison mold; the position of the parts during the packing operation; the position of the parts after inversion of the parison mold and prior to the secondary or blow back operation; the position of the parts during the secondary or blow back operation; the advancement of a blow mold into position to receive an expanded parison; the retracted position of the blow mold with the final blowing means in cooperative relation therewith; and lastly, the position of the parts to permit the removal of a finished piece of ware;

Figure 10 is a diagrammatic view illustrating the relative cooperation of a feeding means and a plurality of units of the character referred to;

Figure 11 is a side elevational view, showing diagrammatically one of the feeding means in cooperative relation to a feeder and a blank mold;

Figure 12 is a diagram showing the relationship of the various parts of the driving mechanism;

Figure 13 is a view partly in section and partly in top plan, illustrating the operating means for the interceptor;

Figure 14 is a vertical sectional view on the line XIV—XIV of Figure 13, looking in the direction of the arrows; and Figure 15 is a side elevational view of the mechanism shown in Figure 13, certain of the parts being broken away or in section.

While, as before pointed out, the complete machine is illustrated herein as comprising four units, it will be understood that the number of units may be increased or diminished at will, depending upon the capacity of the feeding means utilized and the size of the ware being produced.

In view of the various operations which are simultaneously occurring in a machine constructed in accordance with our invention, it is believed that the description will be expedited by considering the same in connection with a single unit, it being understood that the construction and cycle of operations of each of the units is the same.

For facilitating a consideration of the present invention, the operation of one of these units will be considered in accordance with the different operations constituting a complete cycle, it being possible in this manner to more effectively trace the movement and function of the various parts. With this in mind, a complete cycle will be considered as starting with the parts in a position to receive a charge of glass, and the operations of the machine in this connection will be considered under the heading of "Charging and packing".

After a charge of glass has been packed in a blank mold, it is desirable to expand this charge into hollow form by the application of air under pressure thereto, and the steps of the machine incident to obtaining these results will be considered under the heading of "Parison expanding".

After the parison has been expanded in the blank mold, it is ready for transfer to a blow mold wherein it may be blown to hollow form, and the operations incident to effecting a transfer will be taken up under such a heading. The transfer to the blow mold of a partially blown or expanded parison is followed by the blowing thereof to final form, and the machine operations incident to obtaining the final blow will be considered under such a characterization.

The final blow having been completed, it is in order to effect the removal of the finished piece of ware, such removal necessitating an operation of the blow mold such as to permit the ware to be taken therefrom. The part of the machine and the machine operations incident to this removal will be considered in sequence under such a heading.

Lastly, there must be a return movement of the parts into a position ready for the reception of another charge. Regardless of the fact that such a return movement may occur concomitantly with certain of the operations hereinbefore referred to and in advance, in point of time, of some of the operations, recited, it will be taken up as a complete operation and descriptively correlated with respect to point of time to the other operations.

*Charging and packing*

Figure 1:
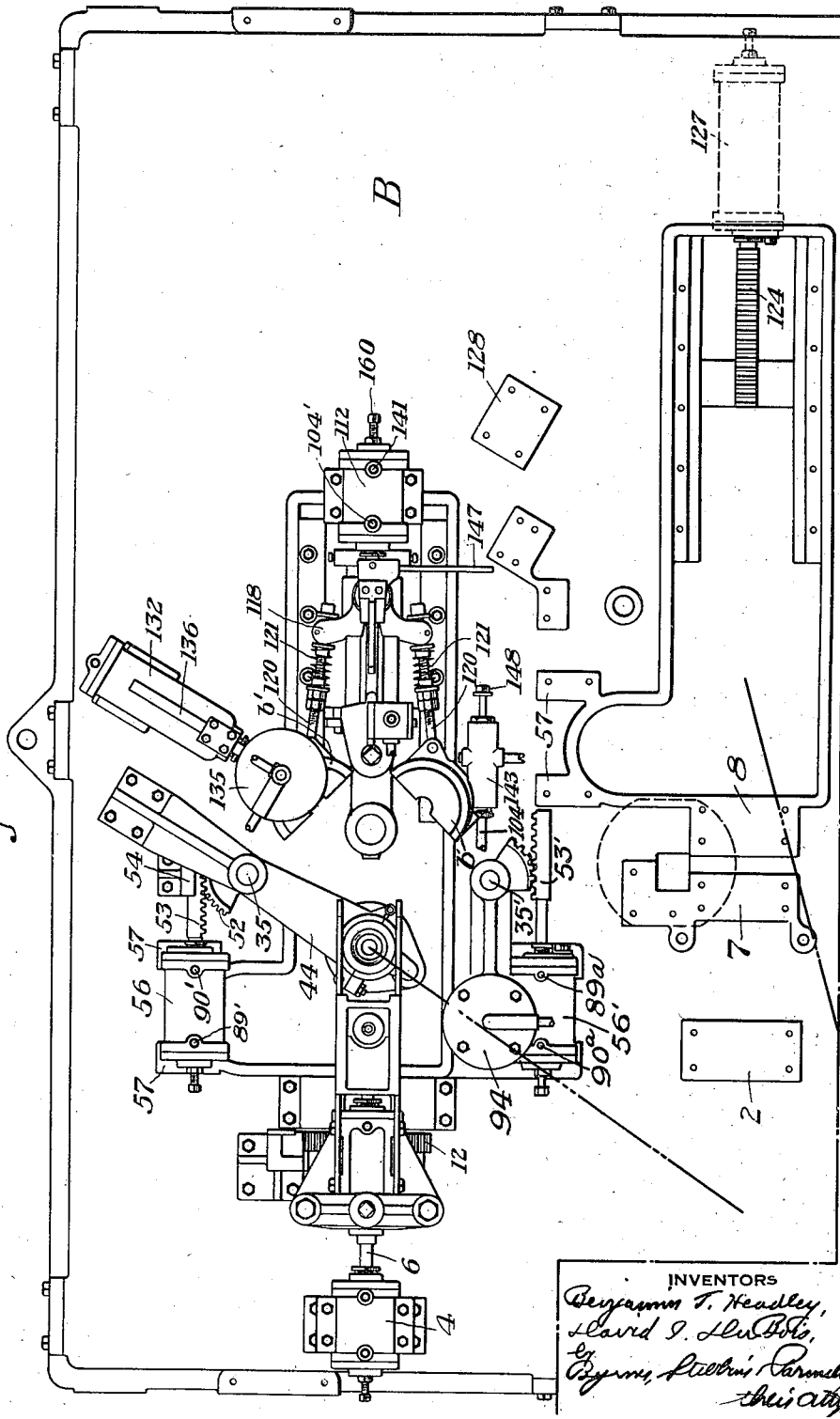
Figure 1 is a top plan view of a portion of a bed plate showing the operative positioning of the bottle forming and formative elements of one unit, together with the relative location of an adjacent unit.

In Figure 1 of the drawings, there is indicated half of a complete machine with respect to base plate construction, the half of the base plate indicated being adapted for the reception of two complete units. In this figure, one of the units is indicated, the construction of the base being shown for the reception of a corresponding unit.

Figure 2:
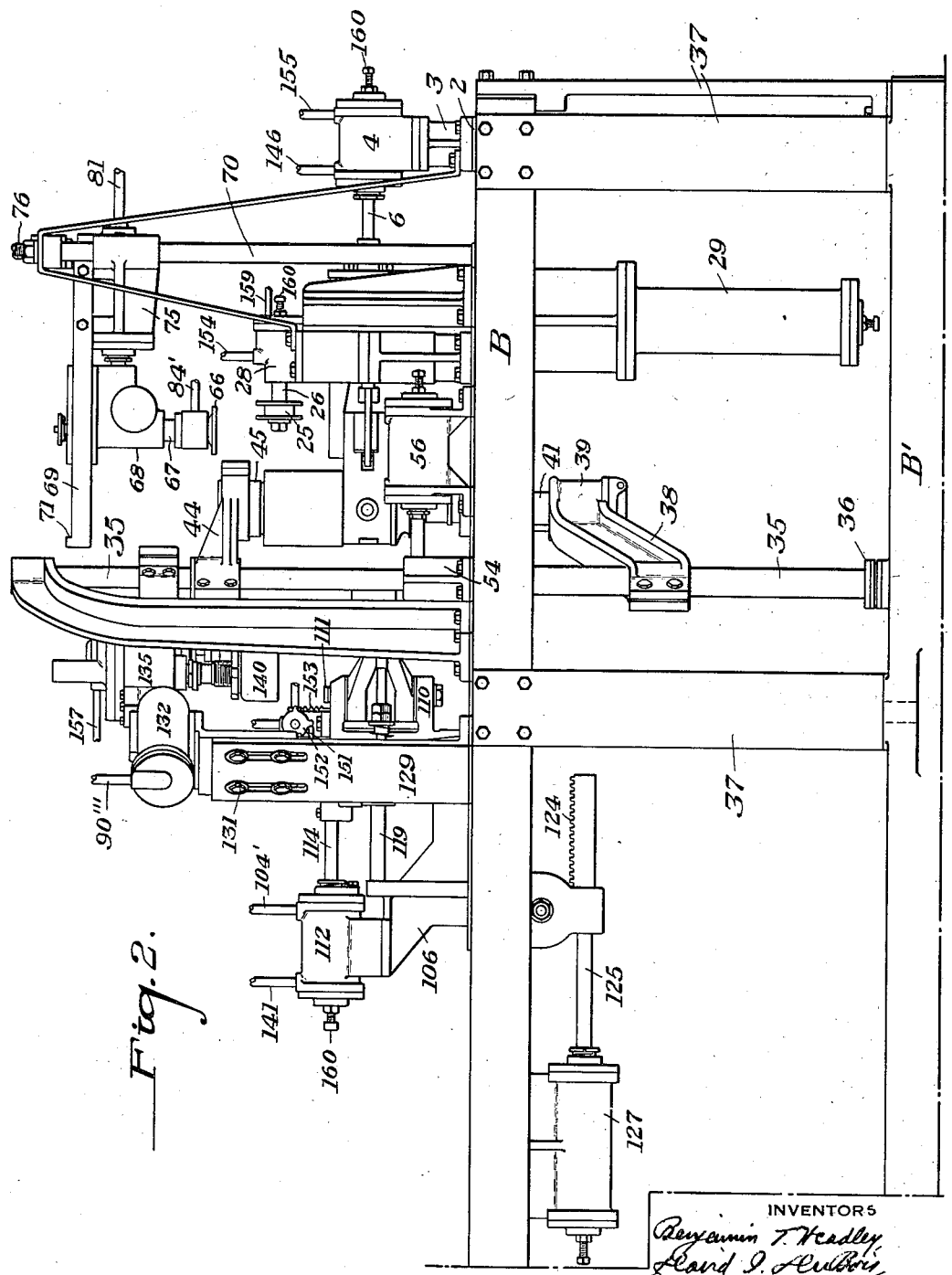
Figure 2 is a partial side elevational view of the unit shown in Figure 1, the view being taken looking toward the unit from that portion adjacent the top of the sheet in Figure 1, and omitting, for sake of clearness, certain parts on the side opposite that from which the view is taken.

In Figures 1, 2 and 9a the parts are shown in the position which they occupy during the charging of the blank mold; and in Figures 4 and 9b they are illustrated in the position which they occupy during the packing blow.

Referring more particularly to the drawings, the table B has a pad 2 for the reception of a pedestal 3, on which is mounted a blank mold opening-and-closing cylinder 4. Mounted for movement within this cylinder is a piston 5, having a piston rod 6 projecting therefrom.

Figure 3:
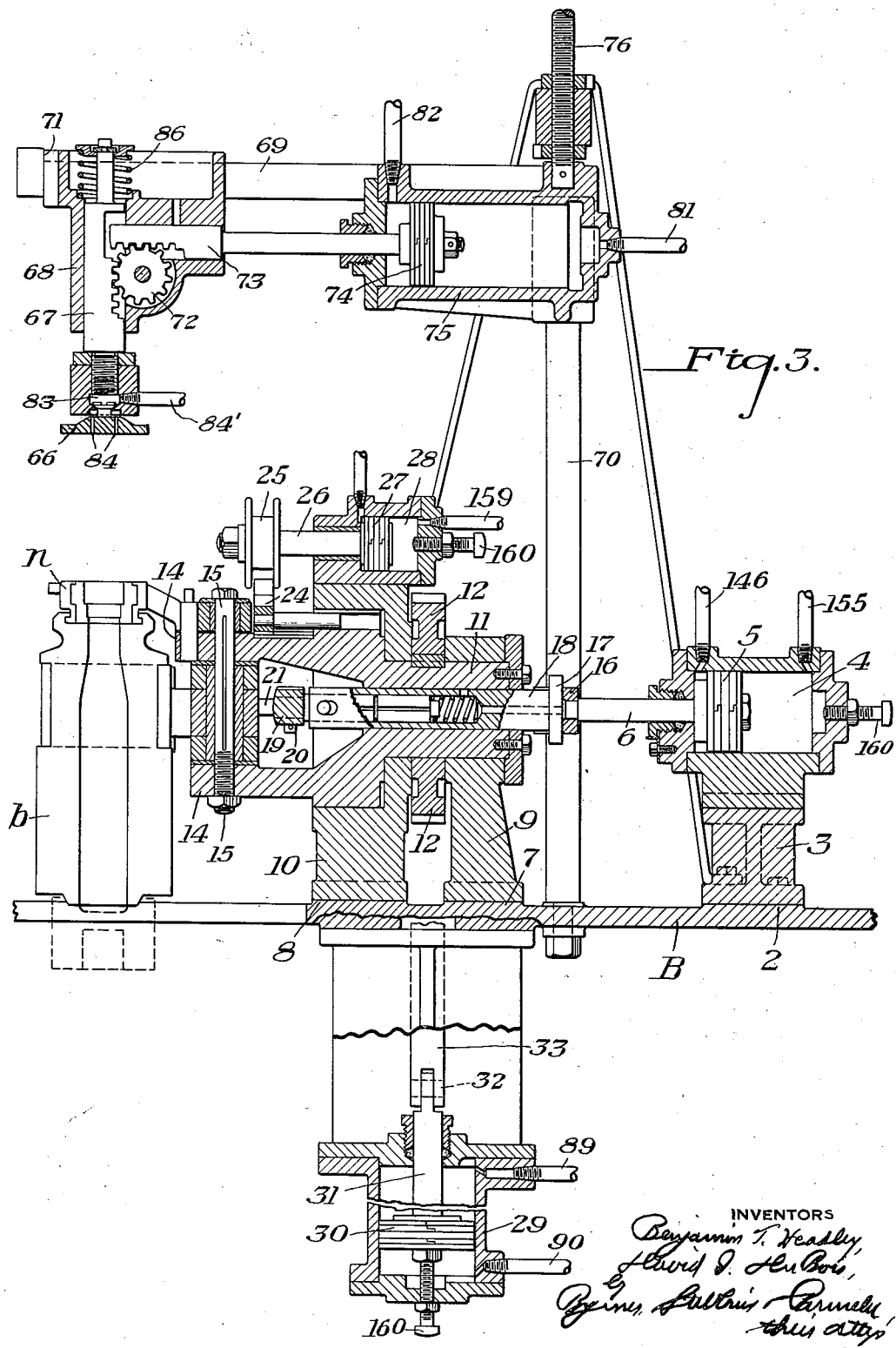
Figure 3 is a detail sectional view, on an enlarged scale, partly broken away and partly in elevation, illustrating a parison mold, neck mold, and primary or packing blow-head, together with the operating means therefor.

Adjacent the pad 2 are pads 7 and 8 upon which the mounted pedestals 9 and 10, as clearly shown in Figure 3, cored out in their upper portions to receive an elongated hollow trunnion 11.

The pedestals 9 and 10 are also placed to receive therebetween a gear 12, which is keyed to the trunnion for effecting rotation thereof. The left hand end of the trunnion 11, as viewed in Figure 3 of the drawings, is bifurcated to provide bearing arms 14 for the reception of a hinge pin 15 which carries the blank mold sections b of the blank mold. The blank mold sections are opened and closed by means of the piston 5, through the medium of a yoke 16, embracing a flange 17, on cross-head sleeve 18. The sleeve 18 extends axially through the trunnion 11 and has secured thereto a cross-head 19 carrying toggle pins 20 with which cooperate toggle links 21 for swinging the blank mold sections about the hinge pin 15 into open position when the piston 5 moves to the right, as viewed in Figure 3, and for swinging the sections in the opposite direction into closed position when the piston moves to the left, as viewed in this figure.

Also carried by the trunnion 11 is a pair of neck ring sections n adapted to swing about the hinge pin 15 during movement to open and closed positions. This movement is accomplished by the provision of toggle bolts 22, toggle links 23, slide 24, and spool 25. The spool 25 is carried by a piston rod 26, actuated by a piston 27, in a neck ring operating cylinder 28, carried by the pedestal 10.

For inverting the trunnion 11, the blank mold, and the neck mold, through the medium of the gear 12, there is provided mechanism as shown in detail in Figures 3 and 3ᵇ. This mechanism comprises an inverting cylinder 29 having a piston 30 therein, the piston rod 31 of which has a pivotal connection 32 with a rack bar 33. The rack bar is mounted in a guide 34 in such manner as to be maintained at all times in cooperative relation with the gear 12.

Extending through the table B at points disposed laterally of the mechanism just described, are indexing columns 35 and 35', illustrated, respectively, in detail in Figures 4 and 5. Each of the indexing columns is of a construction generally similar to that of the other with respect to mounting, operation and function. As illustrated in Figure 2, each indexing column is carried by the base B', on suitable thrust bearings 36, only one of which is shown. The base B' also serves to support the table B in any desired manner, as, for example, by standards 37.

Carried by the indexing column 35 below the table B is a neck pin cylinder bracket 38, supporting a neck pin cylinder 39, having a piston 40 therein, from which projects piston rod 41. At its upper end, the piston rod 41 has operatively secured thereto, in any desired manner, a neck forming pin or plunger 42, held against rotation by means of a guide pin 43, in the bracket 38.

Carried by the indexing column 35, above the table B, is a funnel or pouring guide bracket 44, carrying a funnel or pouring guide 45 in its outer end. The bracket 44 is axially movable along the indexing column 35, and for this reason is provided with a bushing 46, cooperating with the indexing column and with a laterally extending projection 47. This projection cooperates with a piston rod 48, Figure 4ᵃ, carried by a piston 49, in a pouring guide raising-and-lowering cylinder 50, firmly secured to the indexing column against axial movement.

At a point slightly above the table B, the indexing column is formed with a shoulder 51, on which is supported an indexing segment 52, cooperating with an indexing rack 53, slidable in a bracket 54. (See Figures 1 and 5). The indexing rack constitutes an extension of a piston rod secured to a piston (not shown) in the indexing cylinder 56. The indexing cylinder for each unit is mounted on pads 57, on the table.

With a blank mold in neck end down or inverted position, as indicated diagrammatically in Figure 9ᵃ, and with the pouring guide 45 in cooperative relation to its open bottom end, and the neck pin assembly 42 in cooperative relation to its neck end, the mold is ready to receive a charge of glass. Such a charge may be supplied by hand, or by an automatic feeder and chute mechanism, as indicated in Figures 10 and 11. As shown in these figures, there is indicated a feeder 58, adapted to deliver gathers along the axis A—A. Cooperating with the feeder are shear blades 59 for severing the glass into charges. The line A—A intersects the trough-shaped intercepter 60, mounted for rotation for cooperation with chutes 61, 62, 63 and 64, as indicated diagrammatically in Figure 10. In this figure the intercepter 60 is shown in full lines in cooperative relation with the chute 62. Each of the chutes preferably comprises a series of sections supported in any desired manner, one section of which is movable to dotted line position, as indicated in Figure 11, for discharging the gathers to a waste glass trough 65, whereby any unit at will may have the service of glass thereto suspended at any time without interfering with the service of glass to the other units.

After the glass charge has been delivered to the blank mold, it is desirable to pack the same firmly around the neck pin to thereby produce a well-finished strong neck on the ware. This is accomplished through the medium of fluid pressure applied to the upper end of the charge of glass by means of a packing blow-head 66, shown in detail in Figure 3 of the drawings. This packing blow-head is carried by a rack 67, mounted in a guide 68 in a bracket 69. This bracket extends substantially parallel to the table and is supported by posts 70 projecting upwardly from the table B in substantially parallel relation to the indexing column 35, but offset laterally with respect thereto. This bracket comprises spaced arms, each having a stop shoulder 71 thereon for cooperation with the guide 68. Mounted in the guide for cooperation with the rack bar 67 is a pinion 72 which cooperates with a rack bar 73 secured to piston 74 in a packing blow-head operating cylinder 75. This cylinder, together with the mechanism just described, may be adjusted to different vertical positions by means of an adjusting screw 76.

During the charging operation, the packing blow-head 66 and its cooperating parts occupy a position as indicated in Figure 9ᵃ of the drawings. In proper timed relation to the charging of the blank mold, a packing control valve 77 is actuated through a cam 78, on shaft 79, to admit the passage of air under pressure from a main pressure line 80 to the line 81 leading to the right hand end of the packing blow-head operating cylinder 75, as viewed in Figure 3 of the drawings.

At the same time, the line 82, connecting with the opposite end of the cylinder, is opened to exhaust through the valve 77, whereby the piston 74 is caused to travel outwardly to the left and effect movement in the same direction of the guide 68 to the extent permitted by the stop shoulders 71. At this time, further movement of the guide being prevented, the rack 73 will effect rotation in a counter-clockwise direction of the gear 72 and thereby lower the rack 67 and blow-head 66 into cooperative relation to the upper end of the pouring guide 45, as indicated in Figure 4 of the drawings.

The packing blow-head is of any well-known construction, adapted to be unseated by contact with the upper surface of the pouring guide to permit air under pressure to pass from the chamber 83 therein through the openings 84, into the upper end of the mold, the chamber 83 being normally connected to a source of air under pressure through a suitable connection 84'. This air, delivered to the upper end of the blank mold, will create differential pressure conditions in opposite ends of the mold, effective for compacting the glass around the neck forming pin. It will be understood that the rack 67 may be provided with any desired form of shock absorbing spring 86, which spring is also effective at the conclusion of the blow for assisting in the return movement of the parts. The spring also tends to resist downward movement of the rack 67 during such times as the piston 74 is moving to the left, as viewed in Figure 3, thereby insuring a sufficient travel of the guide 68 to bring it into engagement with the stops 71 before the rack starts its downward movement.

In like manner, at the conclusion of the packing blow, the influence of the spring insures a movement of the packing blow-head upwardly prior to the time that the guide 68 starts on its return movement.

The packing blow continues for a length of time determined by the setting of the cam 78, and in predetermined timed relation to its commencement, this cam operates the valve 77 to connect the line 82 to air under pressure and the line 81 to exhaust, whereby the packing blow-head is moved to its inoperative position of Figure 9ª.

At this time the pouring guide 45 is raised by the piston 49, and the neck pin assembly is lowered by the piston 40. These operations are controlled by a pouring guide and neck pin operating valve 83ª, operated by a cam 84ª. This valve is effective for delivering air under pressure through the line 85 and its branches, to the lower end of the pouring guide cylinder 50, and to the upper end of the neck pin cylinder 39. The air to the lower end of the pouring guide cylinder 50 raises the piston 49 therein to clear the pouring guide from the bottom of the mold, while the air to the upper end of the neck pin cylinder 39 lowers the piston rod 41 and its associated parts to withdraw the neck pin or plunger from the neck end of the blank mold.

*Parison expanding*

The charge of glass having been compacted in the parison mold, and the proper neck finish having been obtained, the charge is ready for the expanding blow, by means of which the formed parison is produced.

The desired operations in the above respect are controlled by the operation of an indexing, inverting and final blow controlling valve 87 operated by a cam 88. This valve, when operated by its cam, causes air under pressure to pass through the line 89 and branch 89' to the left hand end of the indexing cylinder 56, as viewed in Figure 1, and to the right hand end of the indexing cylinder as viewed in Figures 2 and 8. This air causes the indexing column 35 to rotate in a clockwise direction, as viewed in Figure 1, thereby moving the brackets 38 and 44 out of cooperative relation with the charged blank mold. At this same time, air under pressure passes from the branch 89' into the branch 89ª, leading to the right hand end of the indexing cylinder 56', as illustrated in Figure 1, and to the left hand end as illustrated in Figure 8. This produces such a movement of the indexing rack bar 53' as to effect rotation of the indexing column 35' in a clockwise direction, thereby moving the parts into the position illustrated in Figure 5, with the bottom closure and expending blow-head in alignment with the charged blank mold. Air under pressure at this time also passes to the upper end of the blank mold inverting cylinder 29, causing it to descend and move the parison mold to upright position, such position being illustrated in Figures 5 and 9ᵇ of the drawings. This movement of the indexing pistons and of the inverting piston is permitted for the reason that the opposite ends of each of the cylinders in which these pistons move are open to exhaust through the line 90 and its branches 90' and 90ª.

With the mold in upright position, the parts are ready for the expanding blow. This is accomplished through the medium of an expanding blow-head 91, similar in construction to the packing blow-head 66, and carried by piston rod 92 secured to piston 93 operative within the expanding blow-head cylinder 94. This cylinder is operated by a bracket 95 secured to the indexing column 35' and rotatable therewith.

Below the table B the indexing column 35' carries a bracket 96, providing a closure operating cylinder 97, within which works a piston 98, the piston rod 99 of which carries a bottom closure 100. The closure is prevented from rotative movement during raising and lowering thereof by guides 101 projecting upwardly from the bracket 96. The brackets 95 and 96 are adjusted on the indexing column 35' in such manner that the axes of the cylinders 94 and 97 are at all times in alignment. The rotation of the indexing column 35' in the manner before described brings the expanding blow-head and the closure into cooperative relation with the mold having the compacted charge therein.

Having arrived in this position, the valve 102 is operated by the cam 103 to admit air under pressure to line 104, which is in communication with the upper end of the cylinder 94 and the lower end of the cylinder 97, the opposite ends of these cylinders being in communication with the exhaust at this time through the line 105. This air under pressure lowers the blow-head 91 into cooperative relation, as shown in Figure 5, with the neck end of the blank mold, and brings the closure 100 into such position that it completely seals the bottom end of the blank mold.

As soon as the blow-head 91 engages the neck end of the blank mold, air is delivered through the neck end in sufficient quantity and amount for blowing the parison to hollow form.

It will be apparent that during this expanding operation the parison is completely confined, the lower end of the blank mold cavity being closed by the closure 100, and the upper end being closed by the expanding blow-head. This expanding blow occurs in predetermined timed relation to the charging of the blank, the inversion of the blank mold, and the application of the confining closure, and continues for a period determined by the setting of the cam 103. At the conclusion of the expanding blow, air under pressure passes through the line 105 to the opposite ends of the cylinders 94 and 97, thereby restoring the expanding blow-head to its upper inoperative position, and the closure 100 to its lower inoperative position. During all of this time, air under pressure has continued to pass to the indexing and inverting cylinders through the line 89 and its branches 89' and 89ᵃ.

*Transfer of parison*

The expanding blow of the parison having been completed, it is ready for transfer to the blow mold wherein the final blowing will take place. In order to effect such a transfer, the blank mold must be opened to release the parison and leave it suspended by the neck mold, and the blow mold must be brought into a position to be closed around the parison.

This feature of opening a blank mold and closing a blow mold while keeping a parison suspended about a given axis has been found to be particularly desirable in that the parison is permitted to hang true in a manner not possible with a rotative machine in which the rotating action tends to throw the parison out of a proper central line.

Each unit of the machine accordingly embodies a sliding support 106 (Figure 7) slidable on guides 107 in the table B. The sliding pedestal carries on one end thereof a bracket 108 in which is supported a mold bottom 109. Above the bracket 108 the pedestal 106 is formed with bearing portions 110 similar to the bearing portions 14 on the trunnion 11 for the blank mold. Extending through these bearing portions is a hinge pin 111 on which the sections b' of the blow mold are mounted for opening and closing movement. Such movement is obtained by means of a blow mold opening-and-closing cylinder 112, carried by the pedestal 106 and having a piston 113 with which cooperates a piston rod 114. This piston rod carries a mold opening finger 115 which cooperates with a roller 116 on a pin 117 in the crosshead 118. The crosshead 118 cooperates with slide rods 119, carried by the pedestal 106. As indicated in Figure 1 of the drawings, the crosshead 118 has laterally projecting portions, each of which cooperates with the mold sections b', through the medium of rods 120 carrying the pressure springs 121, whereby the blow mold sections are forced to closed position under a yielding pressure.

Mounted on the bottom of the pedestal 106 is a rack bar 122, meshing with a pinion 123, which also cooperates with a rack bar 124. This rack bar constitutes an extension of a piston rod 125, secured to a piston 126, operable within a pedestal moving cylinder 127.

Projecting upwardly from the table, and secured to a pad 128 thereon, is a bracket support 129, having a bracket 130 adjustably secured to its upper end through the medium of bolts 131. Mounted on this bracket is a blow-head positioning cylinder 132, having its piston 133 provided with a rod 134, secured at its free end in a blow-head operating cylinder 135. Also cooperating with the cylinder 135 is a guide rod 136, working through a suitable opening 137 on the wall of the cylinder 132, whereby the blow-head cylinder 135 is always caused to travel in a predetermined position. Mounted in this cylinder is a piston 138, having a hollow rod 139, extending therethrough and carrying a blow-head assembly 140, at its lower end.

Simultaneously with the admission of air under pressure to the line 104 for positioning the bottom closure 100 and the expanding blow-head 91, air under pressure passes through the branch line 104' to the right hand end of the blow-mold opening-and-closing cylinder 112, as viewed in Figures 7 and 8, thereby moving the piston therein to the left and causing the finger 115 to effect an opening movement of the blow-mold. This movement of the blow mold opening piston is permitted by reason of the fact that at this time the line 141 is open to exhaust through a port 142 in a control valve 143. This control valve, shown in section in Figure 8 and in plan in Figure 1, is held in a position to permit exhaust therethrough by pressure delivered through the branch 104''.

The blow mold sections thus being open, the mold is ready to commence its travel into a position to receive the parison completed in the blank mold. In order to obtain this operation, the valve 144 is actuated by the cam 145 to supply air under pressure to the line 146 and thus to the left hand end of the blank mold opening cylinder 4, as shown in Figures 3 and 8, to effect movement thereof to the right to open the sections b of the blank mold and leave the parison suspended in the neck ring sections n. At this same time, air under pressure passes through the branch line 146' to the right hand end of the pedestal moving or blow-mold indexing cylinder 127, as viewed in Figures 7 and 8. This causes the piston 126 therein to travel to the left, rotating the gear 123 in a clockwise direction to effect an indexing movement of the pedestal 106 to bring the blow-mold sections b' into a position where they may be closed around the suspended parison. As the indexing movement of the blow mold assembly is about completed, a projection 147 thereon engages the stem 148 of the control valve 143, thereby moving it to the right, as viewed in Figure 8, to bring the annular port 149 therein into registration with the pressure supply line 150. At this time, air under pressure passes from the line 150 through the valve and line 141 to the left hand end of the blow mold closing cylinder 112, thereby moving the sections b' of the blow-mold to closed position around the parison.

As the blow mold assembly reaches its properly indexed position, another projection 151 thereon engages a rocker valve 152 (Figures 7 and 8), thereby rotating the valve in a counter-clockwise direction against the action of a spring 153, into the full line position shown in Figure 7. At this time air under pressure passes through the line 150' and the rocker valve to line 154 communicating with the left hand end of the neck ring opening cylinder 28, as viewed in Figures 3 and 8. This causes the piston 27 therein to move to the right, causing the spool 25 to open the neck ring sections n, so that the parison is completely supported by the blow mold.

The movement of the blank mold piston 5 and of the blow mold indexing piston 126, as previously described, in such manner as to open the blank mold sections and index the blow-mold assembly under the influence of air pressure in the line 146 and its branch 146', is permitted by having the opposite ends of the respective cylinders containing these pistons open to exhaust at this time. This is accomplished through a connection 155 and its branch 155' controlled by the valve 144.

*Final blow*

After the parison has been released from the neck mold, it is ready for the final blowing, which is accomplished by means of the final blow-head 140. In order to bring the blow-mold assembly into proper position to permit this final blow, it is necessary to restore such assembly to the position indicated in dotted lines in Figure 6. To accomplish this, the cam 145 functions to cut off the flow of air to the line 146 and its branch 146', opening these lines to exhaust, and applying pressure to the line 155 and its branch 155'.

This causes the indexing rack 124 to move to the right, as viewed in Figure 7, thereby moving the pedestal 106 and its associated parts to the left. After this movement, the cam 88 is in such position that the valve 87 delivers air under pressure to the line 90 and its branches 90'' and 90'''. The branch 90'' communicates with the upper end of the final blow-head cylinder 135, thus causing the blow-head assembly 140 to be lowered into blowing relation with the upper end of the blow-mold. As the blow-head assembly lowers, an annular port 156 on the hollow rod 139 is brought into registration with a pipe 157, by means of which air for blowing purposes is delivered through the hollow rod to the blow-head.

The connection 90''' communicates with the left hand end of the blow-head positioning cylinder 132, as viewed in Figure 8 (the right hand end as viewed in Figure 6), thereby causing the blow-head to move bodily outward into alignment with the blow-mold. The outward movement occurs substantially simultaneously with the lowering movement, whereby the parts are quickly brought into position for the final blow. The length of this blow is determined by the construction of the cam 88, and is terminated by opening the line 90 to exhaust and the line 89 to air under pressure. At this time, the air will pass to the branch 89'' to the lower end of the cylinder 135 and to the right hand end, as viewed in Figure 8, of the cylinder 132, through the connection 89'''. Thus the blow-head will be restored to inoperative position.

*Removal*

The removal of a finished piece of ware from the blow mold occurs at the time when the blow mold sections are open preparatory to their forward movement into a position to receive a blown parison. This position of the parts is indicated diagrammatically in Figure 9ᵍ, in which the finished article is shown resting on the bottom 109, ready to be engaged by any desired form of mechanical take-out mechanism 158.

*Return movement*

At the same time that air under pressure is admitted through the line 155' to the blow-mold indexing cylinder 127 for effecting movement thereof from the position indicated in Figure 9ᵉ into the position indicated in Figure 9ᶠ for the final blowing operation, air under pressure is relieved from the line 154 by the release of the rocker valve 152, and is applied to the line 159 for effecting a closing movement of the sections of the neck ring mold. At this same time air passes through the line 155 into the blank mold closing cylinder 4 in such manner to effect a closing movement of the blank mold sections.

When air is delivered through the line 90 to effect the final blowing operation by means of the branches 90'' and 90''', it also passes to the lower end of the blank mold inverting cylinder 29 for restoring the blank mold to its inverted bottom end up position.

Air delivered through the line 90 also passes by way of the branches 90' and 90ᵃ into the right hand end of the indexing cylinder 56, as viewed in Figure 1, and the left hand end of the indexing cylinder 56', as illustrated in this same figure. The air delivered to the indexing cylinder 56 is effective for rotating the indexing column 35 in a counterclockwise direction, as viewed in this figure. This movement carries the pouring guide bracket 44 and the neck pin plunger assembly bracket 38 into alignment with a blank mold, as indicated in Figures 1 and 9ᵃ, preparatory to the delivery of a fresh charge of glass thereto. This movement is permitted due to the fact that the air admitted to the indexing cylinder 56' effects counter-clockwise rotation of the indexing columns 35', as viewed in Figure 1, thereby moving the blow-head cylinder 94 and its associated parts carried by the bracket 95 as well as the bottom closure 100 and its associated parts carried by the bracket 96 out of cooperative relation to the blank mold and into the position illustrated in Figure 1.

The air under pressure delivered through the branch 90' at this time is effective through the column indexing cylinder 56 for rotating the column 35 in a counter-clockwise direction, as viewed in Figure 1. Simultaneous movement of the indexing columns 35 and 35' carries the expanding blow-head cylinder 94 and its associated parts carried by the bracket 95 out of alignment with the blank mold, and brings the brackets 44 and 38 carrying the pouring guide and neck pin assemblies, respectively, into alignment with a blank mold, as indicated in Figures 1 and 9ᵃ, ready for a fresh charge of glass.

From the foregoing description, it will be apparent that many operations are occurring simultaneously in each unit. The charging of the blank mold occurs first, followed by the application of the packing blow by the packing blow-head 66. Upon termination of the packing blow, there occurs the column indexing movements, and inversion of the blank mold preparatory to the expanding blow for the parison. Concurrently with the indexing and inversion, a previously transferred parison is blown to final form in the blow mold. At the completion of the final blowing operation the blank is expanded in the blank mold. Upon completion of the final blow, the blow mold is opened and the finished ware removed therefrom. Upon completion of the removal, the blank mold is opened, the blow mold indexed into position and closed around the blank, the neck ring opened, and the blow mold returned to its position for final blow. The indexing movement of the blow mold into transferring position occurs concomitantly with the opening of the blank mold, and its movement out of such position occurs concomitantly with the closing of the blank mold preparatory to receiving a fresh charge. It will be understood that any one or all of the cylinders may be provided with adjustable stop means 160 whereby the stroke of the piston therein in one direction may be positively limited, and that by-pass check valves 161 may be placed in the various pipe lines adjacent the cylinders in such manner that the exhaust therefrom will be cushioned to the extent desired.

One of these check valves 161 is illustrated in section in Figure 9', it being apparent from an inspection of this figure that a free flow of air is permitted in one direction while a restricted flow only can occur in the opposite direction depending upon the seating of the check valve.

The various valves 77, 83ª, 87, 102 and 144 are of similar construction, one of these valves being illustrated in section in Figure 9. As illustrated in this figure, the respective cams are adjustably mounted on the shaft 79 which is continuously driven. These cams cooperate with rocker arms 162 carrying adjustable contact screws 163. By reason of the construction of the cams and their mounting, any desired shape and any desired time of operation with the required dwell is readily provided. The rocker arms comprise compound levers, one part of which is adjustable relatively to another through the adjustment 164. In operation, the adjustable screw 163 engages the stem of the valve 165 and lifts it until the contracted portion 166 bridges ports 167 communicating with the pressure supply line 80 and port 168 which communicates with one of the lines 155, 90, 104, 86 or 81, thereby allowing air under pressure to pass to one of these lines. At this time the corresponding line 146, 89, 105, 85 and 82 of each pair will be open to exhaust through the port 169 around the contracted portion 170 to the port 171. The continuous action of the cam thereafter allows the valve stem to lower through the action of a spring 172. When it reaches its lowermost position, the contracted portion, as shown in full line in this figure, bridges the ports 167 and 169, thereby applying air under pressure from the port 167 to the line of each pair which was previously open to exhaust, and opens the other line of each pair to exhaust through the port 168 and the space above the valve to the port 173.

The setting of the cams determines the timing of the various operations and the duration of each of these operations, thereby insuring a condition in which the various operations take place in predetermined timed relation.

It will be apparent that one complete timing unit of this character may be utilized for each section of the machine, the proper adjustment of the cams of each unit determining the proper sequence of operations in the various machine sections.

In Figure 12 there is illustrated diagrammatically a layout for accomplishing the desired results. In accordance with this layout, there may be provided a main driving motor 174, having on its shaft a sprocket wheel 175, adapted to drive a similar wheel 176 through a sprocket chain 177. Also carried by the motor shaft is a suitable coupling 178, preferably a so-called Francke coupling, for transmitting power to a suitable speed reduction box 179. This box has a shaft 180, driving the various timing units so as to maintain the same in proper timed relation one with the other. Also projecting from the speed reduction box is a shaft 181 which operates through a gear reduction 182 for driving a cam 183. The cam 183 constitutes the driving means for obtaining the desired movement of the feeder chute or intercepter, and the sprocket 176 constitutes the driving means for the shaft 184 of the feeder.

In Figure 13 we have illustrated a portion of this mechanism, partly in top plan and partly in section. The shaft 181 is shown extending from the speed reduction box 179 and operative through the reducing gear 182 for rotating the cam 183.

In Figure 14, the cam 183 is shown in cooperative relation to a roller 184, carried by a link 185, having a pivotal mounting 186. A spring 187 normally holds the roller 184 in contact with the periphery of the cam. The lower end of the lever 185 is connected loosely to a pin 188 extending outwardly from a rack bar 189 horizontally slidable in a guide groove 190. Under the influence of the cam 183, rotating in the direction indicated by the arrow in Figure 14, the lever 185 will be gradually moved to the right to thereby effect reciprocation of the rack bar 189. This rack bar meshes with a segmental gear 191 on the lower end of a shaft 192, the upper end of which carries the intercepter 60 of Figures 10 and 11. The cam 183 is so shaped as to produce the desired movement of the intercepter to bring it successively into cooperative relation with the troughs 61, 62, 63 and 64, it being provided with different radius sectors 193, 194, 195 and 196 for this purpose. Intermediate the points 196 and 193, the cam undergoes an abrupt change of radius to permit a quick return of the intercepter from a position in which it cooperates with the chute 64 to a position in which it will cooperate with the chute 61. Each of the numbered sectors on the cam is formed to provide a sufficient dwell to cause the intercepter to remain in registration with one of the chutes a length of time to permit the delivery thereto of a charge of glass.

Projecting from the side of the gear reduction box 179 opposite that from which the shaft 181 extends, is the shaft 180 for the timer, as shown in Figures 13 and 15, while in Figure 13 is shown the motor shaft through which the drive is effected as indicated diagrammatically in Figure 12.

It will be apparent to those skilled in the art that the construction of each section or unit of a non-rotating machine of the character herein disclosed comprises a blank or parison mold and a blow mold adapted to close around a common axis to effect transfer, these molds at all times except during the actual transferring operation being sufficiently spaced from each other to permit any operating element cooperating with either the blank mold or the blow mold to function without any interference from any other operating element. This enables an increased production to be obtained in a manner not possible in the well-known intermittently rotated table type of machine.

The invention further obviates the objections inherent in the use of intermittently rotated types of bottle making machines with respect to the great amount of power required for starting and stopping rotation of the tables at frequent intervals with the shock incident to the stopping.

With an intermittent machine there are also periods wherein the partly finished suspended parison is distorted due to its tendency to sway away from the circular path of the rotating table. Where such a distortion takes place, the blank does not again regain its true vertical alignment, with the result that when the transfer to the blow mold is effected and the parison blown to finished form, the bottles are of unequal thickness and poorly made. In a machine in accordance with the present invention there is no rotation, and consequently the suspended parison remains in a truly vertical line with the glass uniformly distributed about its own axis, thereby eliminating distortion and improving the quality of the finished ware.

Also, in intermittently rotated machines the formative or operative elements can only operate while the tables are at rest, and the actual operating cycles are correspondingly reduced by the time required to start, move, and bring the tables to rest. This materially decreases the capacity of the machine. In an apparatus according to the present invention, the formative elements are positioned so that one may operate independently of the other, and they are synchronized with respect to all of their movements through the master timing mechanism provided for that purpose, whereby the steps of making a bottle may be continued without interruption from the charging operation to the take-out operation. This results in an increased capacity since the time ordinarily required in a rotating machine for the rotation thereof is made available for the accomplishment of forming operations.

The present invention also provides a machine in which the number of units may be increased or decreased at will and in which each unit is so constructed that the axis of each blank mold when in closed position is the same distance from the point of discharge of the glass gob from the feeder, thereby insuring delivery of successive gathers to the molds of the different units under the same conditions as to temperature characteristics. It also enables any unit to be cut out of operation at will without affecting the other units and provides an apparatus capable of use either with manual feeding or machine feeding.

We claim:

1. In a glass working machine, a mold table, a blank mold and blow mold carried by said table for closing movement about a common vertical axis, means for bodily shifting the blow mold toward and from said axis, a column cooperating with the blank mold, charge guiding and neck finishing means carried by said column, a second column, blowing means and closure means carried by said second column, means for moving the columns to first bring the guiding and neck finishing means into cooperative relation to a blank mold and for thereafter bringing the blowing and closure means into cooperative relation with said mold, a neck mold, means for opening and closing the blank mold to leave a blank suspended in the neck mold, means for closing the blow mold around the suspended blank, means for opening the neck mold to release the blank, and means for finish blowing the parison in the blow mold after it has been shifted away from the blank mold.

2. In a glass working machine, a stationary mold table, a blank mold thereon, a blow mold thereon, formative means cooperating with said blank mold including a guide, a neck pin, a blowhead, and a mold closure positioning means supporting all of said formative means, means for effecting predetermined movement of said positioning means to first bring said guide and neck pin into cooperative relation to a blank mold and then bring said blowing means and closure means into cooperative relation therewith, means for transferring a blown parison from the blank mold to the blow mold, and formative means cooperating with the blow mold.

3. In a glass working machine, a stationary mold table, a blank mold thereon, a blow mold thereon, formative means cooperating with said blank mold including a guide, a neck pin, a blowhead, and a mold closure, positioning means supporting all of said formative means, means for effecting predetermined movement of said positioning means to first bring said guide and neck pin into cooperative relation to a blank mold and then bring said blowing means and closure means into cooperative relation therewith, means for transferring a blown parison from the blank mold to the blow mold, and formative means cooperating with a blow mold, there being a continuously driven valve assembly for timing the operation of said molds and said formative means.

4. In a glass working machine, a mold table, a blank mold and blow mold carried by said table for closing movement about a common vertical axis, means for bodily shifting the blow mold toward and from said axis, a column cooperating with the blank mold, charge guiding and neck finishing means carried by said column, a second column, blowing means and closure means carried by said second column, means for moving the columns to first bring the guiding and neck finishing means into cooperative relation to a blank mold and for thereafter bringing the blowing and closure means into cooperative relation with said mold, a neck mold, means for opening and closing the blank mold to leave a blank suspended in the neck mold, means for closing the blow mold around the suspended blank, means for opening the neck mold to release the blank, means for bodily shifting the blow mold toward and from the blank mold for effecting a transfer of the parison, and means for finish blowing the parison in the blow mold after it has been shifted away from the blank mold.

5. In a glass working machine, a feeding station, means for feeding successive charges of glass to said station, a plurality of units stationary relative to and grouped arcuately about said feeding station, each unit comprising a blank mold and a blow mold closable about a common vertical axis, means for closing the molds about said axis, means for conveying the glass charges to the blank molds in succession, means for bodily reciprocating the blow mold to said common vertical axis from a blowing station and return, and means for blowing the parison in said blow mold, said common axes about which the molds of the units are closable being disposed at the same radial distance from the feeding station.

6. In a glass working machine, a glass working unit having a filling station and a blowing station, said unit comprising a parison mold for receiving a charge of glass at the filling station and there forming a parison, a blow mold reciprocable from the blowing station to the filling station to receive a parison there suspended and carry the same back to the blowing station, and means for operating said molds to effect the transfer of the suspended parison from the parison mold to the blow mold at the filling station and the blowing of the parison in the blow mold at the blowing station.

BENJAMIN T. HEADLEY.
DAVID IRVIN DU BOIS.